United States Patent [19]

Stein

[11] Patent Number: 4,714,802

[45] Date of Patent: Dec. 22, 1987

[54] APPARATUS AND METHOD FOR DETERMINING THE SOURCE DIRECTION OF LOCAL AREA NETWORK TRANSMISSIONS

[75] Inventor: Charles R. Stein, Schenectady, N.Y.

[73] Assignee: General Electric Company, Schenectady, N.Y.

[21] Appl. No.: 896,499

[22] Filed: Aug. 14, 1986

[51] Int. Cl.⁴ ............................................. H04B 3/03
[52] U.S. Cl. ...................................... 178/1; 178/2 R; 375/36; 333/119
[58] Field of Search .................. 178/2, 45, 696, 74, 178/1; 370/14; 375/36; 379/443; 455/49, 80, 81; 333/109, 119

[56] References Cited

U.S. PATENT DOCUMENTS

| | | | |
|---|---|---|---|
| 3,048,798 | 8/1962 | Simons | 333/10 |
| 3,716,806 | 2/1973 | Zelenz | 333/10 |
| 4,032,911 | 6/1977 | Melvin, Jr. | 455/15 |
| 4,411,004 | 10/1983 | Graham | 333/109 X |
| 4,517,670 | 5/1985 | Ulug | 370/85 |
| 4,649,535 | 3/1987 | Ulug | 370/86 |

OTHER PUBLICATIONS

Allowed U.S. patent application Ser. No. 802,482 entitled "Method and Apparatus for Maintaining a Dynamic Logical Ring in a Token Passing LAN", M. E. Ulug, including 2/9/87 amendment thereto.

Primary Examiner—Stafford D. Schreyer
Attorney, Agent, or Firm—Richard V. Burgujian; James C. Davis, Jr.; Paul R. Webb, II

[57] ABSTRACT

A direction sensitive coupling unit, and method of operation, is disclosed for use in a communication medium to indicate the presence and source direction of transmissions. A directional coupler is provided for receiving information signals from first and second directions along the medium and for providing an attenuated information signal as its output wherein the attenuation to information signals received from the first direction is greater than the attenuation to signals received from the second direction. A voltage sensitive indicating circuit is coupled to the medium and is adapted to respond to the coupler output for providing a digital indication of the presence and source direction of transmissions on the medium.

9 Claims, 4 Drawing Figures

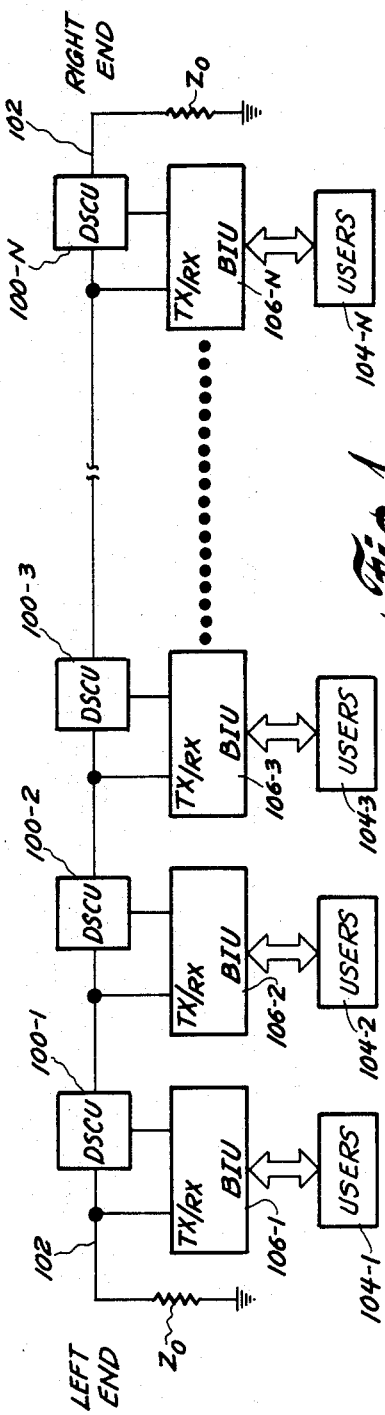
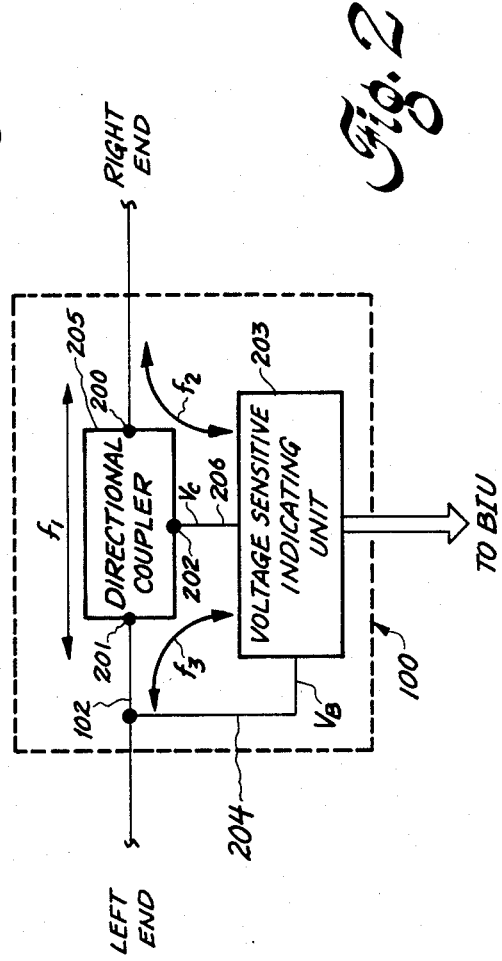

APPARATUS AND METHOD FOR DETERMINING THE SOURCE DIRECTION OF LOCAL AREA NETWORK TRANSMISSIONS

BACKGROUND OF THE INVENTION

The present invention is directed in general to communication systems and, more particularly, to a direction sensitive coupling unit, for use in a local area network, to indicate the source direction of network transmissions.

Local area network is a tern used to define the systems and protocols (hardware and software) for interconnecting a multiplicity of autonomous computing devices in an office, building, or manufacturing environment. Typically, a plurality of computing devices, or users, are coupled to a common transmission medium via a bus interface unit (BIU). The BIU is provided to receive messages from the user and thereafter transmit these messages to other BIUs via the transmission medium in accordance with the network protocol.

Several standard local area network protocols now in use require a BIU to monitor the transmission medium to ascertain its status. For example, contention networks require the BIUs thereof to monitor the transmission medium to ascertain whether another BIU is transmitting. Similarly, token passing networks require the BIU to monitor the transmission medium to ascertain whether activity occurs within a predetermined interval. However, these standard protocols do not require the BIUs to determine the source direction of transmissions. Accordingly, prior art systems provide no apparatus for performing this task.

Nonetheless, there exists a need for apparatus, for use with a BIU, to ascertain the source direction of local area network transmissions in addition to ascertaining when information is being transmitted via the medium. This information could be used for improving existing protocols as well as providing new protocols. As an example, information indicating the source direction of network transmissions could be used in contention networks for resolving conflicts occurring therein. In such a protocol, whenever a conflict occurs, the BIU attempting transmission from a predetermined direction could, for example, "win" the conflict and continue transmitting. This is in contrast to existing contention networks wherein conflict is resolved by each BIU involved in the conflict terminating its transmission and remaining idle for a time period of random duration before attempting to retransmit.

Other uses for information regarding the source direction of transmissions in a local area network will become apparent to those skilled in the art.

One difficultly encountered in determining the source direction of transmissions in a local area network is that the nature of the transmission signal does not indicate its source direction. This situation is to be distinguished from that encountered in other types of communication systems. For example, in power distribution line systems, communication signals are transmitted over the power lines and include some characteristic, e.g., carrier frequency, data sequence, etc., that is specific to the source direction. In such a system, source direction may be ascertained by evaluating the direction specific characteristic of the signal.

SUMMARY OF THE INVENTION

The present invention provides a direction sensitive coupling unit (DSCU) for indicating the presence and source direction of transmissions in a local area network. Also disclosed is a local area network employing the direction sensitive coupling unit disclosed herein.

A directional coupled is coupled to the transmission medium to receive information signals from different directions along the medium. The directional coupler is adapted to provide an output signal indicative of the direction from which the information signal was received. The output of the coupler comprises the transmitted information signal attenuated such that information signals received from one direction along the medium provide coupler output at a greater voltage than information signals received from another direction along the medium.

A first voltage sensitive indicating unit is coupled to the directional coupler and adapted to indicate when information signals supplied thereto are greater than a first threshold voltage. By selecting the first threshold voltage to be greater than the value of the lesser coupler output voltage, the voltage sensitive unit will only respond to coupler outputs corresponding to information signals received from one direction along the medium.

Likewise, a second voltage sensitive indicating unit is coupled to the transmission medium and adapted to indicate when information signals are supplied to the medium. The first and second voltage sensitive indicating units work in conjunction to indicate when a BIU is transmitting and further to indicate whether this transmission was received at a first or second port of the DSCU.

It is, therefore, an object of the present invention to provide a direction sensitive coupling unit for indicating when transmissions are supplied to the transmission medium of a local area network.

It is a further object of the present invention to provide a direction sensitive coupling unit for indicating from which direction a transmission has been supplied to the transmission medium of a local area network.

BRIEF DESCRIPTION OF THE DRAWINGS

The subject matter which is regarded as invention is particularly pointed out in the claims appended hereto. The invention, however, both as to organization and method of practice, may best be understood from a reading of the following detailed description taken in conjunction with the drawings in which:

FIG. 1 is an illustrative block diagram of a local area network employing the direction sensitive coupling units which are the subject of the present invention;

FIG. 2 is a more detailed illustrative block diagram of the direction sensitive coupling units of FIG. 1;

DETAILED DESCRIPTION OF THE DRAWINGS

Figure 3:
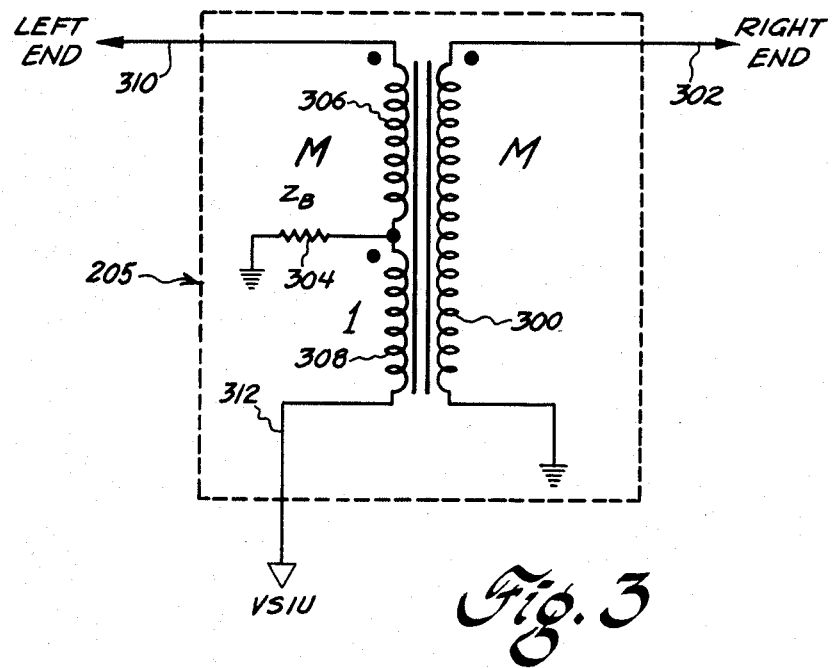
FIG. 3 is a schematic drawing of one embodiment of the directional coupler of FIG. 2.

In accordance with the present invention, a direction sensitive coupling unit is provided for use with a local area network in determining the presence and source direction of network transmissions. Local area networks, both hardware and software, are becoming well known throughout the art. See, for example, IEEE Standards for Local Area Networks, Published by IEEE (1985) and distributed by Wiley-Interscience. See also, U.S. Pat. No. 4,517,670, issued May 14, 1985 to Ulug, and assigned to the assignee of the present invention, which is incorporated herein in its entirety.

A particular local area network for use with the present invention is shown in FIG. 1. Therein, a plurality of direction sensitive coupling units 100-1 through 100-N are coupled serially to a common transmission bus 102, the bus being terminated at its ends by an impedance $Z_0$ characteristic thereof. A plurality of autonomous computing devices 104-1 through 104-N are each coupled to transmission bus 102 via a respective bus interface unit (BIU) 106.

Transmission bus 102 may comprise any transmission medium for transmitting A.C. modulated digital signals between used devices 104 via bus interface units 106, as is known in the art. As an example, transmission bus 102 may comprise a coaxial cable as available from the Belden Electric Wire and Cable Company. Transmission bus 102 is terminated at both ends by its characteristic impedance $Z_0$. Impedance $Z_0$ is provided to prevent transmissions from being reflected back onto bus 102 after arriving at the end thereof. Proper values for impedance $Z_0$ may be readily obtained by those skilled in the art after selecting transmission bus 102.

While the subject invention is shown and described by reference to a bidirectional transmission bus, i.e., a single transmission bus for both transmitting and receiving information, it will be appreciated by those skilled in the art that the present invention may be used with unidirectional transmission systems wherein a unidirectional transmit bus is provided for transmitting information and a unidirectional receive bus is provided for receiving information. In such an embodiment, a remodulator, repeater or other similar device may be coupled intermediate the transmit and receive buses for receiving information transmitted on the transmit bus and retransmitting this information on the receive bus.

Devices 104-1 through 104-N may comprise any autonomous computing devices typically found in local area networks. For example, devices 104 may comprise personal computing devices, automated manufacturing devices, printing devices, memory devices, etc. While only one device 104 is shown coupled to each BIU 106 in FIG. 1, it will be understood that a plurality of autonomous computing devices 104 may be coupled to each bus interface unit 106 for communication with transmission bus 102.

Bus interface units 106 are provided for transferring information signals between transmission bus 102 and users 104 in accordance with the particular protocol of the local area network. Bus interface units 106 may, therefore, be adapted to implement a contention protocol, a token passing protocol, or any other protocol known in the art. Each bus interface unit 106 is shown coupled directly to transmission bus 102 via a transceiver port TX/RX for transmitting and receiving information signals to and from other BIUs 106 via bus 102.

The transceivers of BIUs 106 may comprise any known device or devices for transmitting and receiving digital data modulated upon an alternating current carrier. Further, the transceiver must transmit a signal with a determinable range of maximum and minimum voltages $V_{max}$ and $V_{min}$, respectively. As an example, a transceiver for use with BIU 106 may comprise a Model 30-0078-3 modem as available from the Computrol Corporation and adapted to transmit a digital signal modulated upon an A.C. carrier at an amplitude range of approximately 0.3 volts to 0.4 volts ($V_{min}=0.3$ volts and $V_{max}=0.4$ volts).

BIUs suitable for use in the present invention are shown and described in the above referenced patent to Ulug. Another device suitable for use in the present invention as a BIU may be obtained from the Intel Corporation as Model SBC 86/51 bus interfacing unit.

Each BIU 106 is also shown coupled directly to a respective direction sensitive coupling unit (DSCU) 100 for receiving information indicating whether another BIU is transmitting and, if so, whether the transmission originated from the right or left end (with respect to the view of FIG. 1) of bus 102 with respect to the subject DSCU 100.

With reference to FIG. 2, there is shown a more detailed illustrative block diagram of each direction sensitive coupling unit 100. Therein, each DSCU is shown to comprise a directional coupler 205 having two ports 200 and 201 coupled in series with transmission bus 102. Directional coupler 205 further includes a third port 202 coupled to a voltage sensitive indicating unit 203 by a line 206. Voltage sensitive indicating unit 203 is also shown coupled directly to transmission bus 102 via line 204. Though shown coupled to the transmission bus at the left of directional coupler 205 in FIG. 2, line 204 could instead be coupled to transmission bus 102 at the right of the directional coupler. Lines 204 and 206 may each comprise a coaxial cable.

As shown in FIG. 2, directional coupler 205 provides a first minimum attenuation factor $f_1$ (approximately 0.7 db) in the transverse direction, that is between ports 200 and 201 along transmission bus 102. A second moderate attenuation factor $f_2$ (approximately 12.5 db) is provided between the right end port 200 (as seen in FIG. 2) of directional coupled 205 and voltage sensitive indicating unit 203. A third high attenuation factor $F_3$ (approximately 30 db) is provided between the left end port 201 of directional coupler 205 and voltage sensitive indicating unit 203. Thus, transmissions originating from either the left end direction or the right end direction of coupler 205 are transferred thereacross with only minimal attenuation to the transmitted message. Transmissions originating from the right end direction of directional coupler 205 are transmitted to the voltage sensitive unit 203 with relatively greater attenuation. Further, transmissions originating from the left end direction of the directional coupler are most attenuated (relative to the other transmissions) before being supplied to voltage sensitive unit 203. Adapted in this manner, the output voltage $V_C$ of coupler 205 indicates the direction from which information signals are received at DSCU 100.

The voltage sensitive indicating unit 203 monitors the coupler output voltage $V_C$. If $V_C$ is greather than a first threshold voltage $V_{1t}$, chosen to be greater than the maximum transmission voltage $V_{max}$ (discussed above with reference to BIUs 106 of FIG. 1) attenuated by the third factor $f_3$, i.e., $$V_{1t} > V_{max}/(10^{f_3/20}),$$

then a signal is generated indicating that a transmission has been received at port 200 of coupler 205.

Voltage sensitive unit 203 also monitors the voltage $V_B$ on the transmission medium via its connection 204 to bus 102. If $V_B$ is greater than a second threshold voltage $V_{2t}$, chosen to be less than the minimum transmission voltage $V_{min}$ attenuated by the total number N of first factors $f_1$, wherein N is equal to the number of DSCUs 100, i.e., $$V_{2t} < V_{min}/[N10^{i/20}],$$

then a signal is generated indicating the presence of an information signal on bus 102.

The output of unit 203 may comprise a two digit binary number wherein the state of one digit indicates whether a transmission has been sensed on bus 102 and the other digit represents the direction of the sensed transmission.

Directional coupler 205 may comprise any device, or combination of devices, for providing the necessary coupling coefficients shown in FIG. 2. As an example, directional coupler 205 may comprise a CATV tap model DC-12B as available from the Jerrold Electronics Company. Additionally, directional coupler 205 may comprise a hybrid transformer such as that shown in FIG. 3.

With reference to FIG. 3, directional coupler 205 is shown to comprise a hybrid transformer having a first coil 300 including M turns, grounded at one end, and coupled to transmission bus 102 via lead 302. A second coil, electromagnetically coupled to coil 300 is provided with a tap coupled to ground via balancing impedance 304. Balancing impedance 304 divides the second coil into two parts 306 and 308. Coil 306 has M turns and is coupled to transmission bus 102 via lead 310. Coil 308 has one turn and is coupled to voltage sensitive indicating unit 203 via lead 312. By choosing the proper value for balancing impedance 304, attenuation factors as shown in FIG. 2 between leads 302, 310 and 312 can be approximated. Particularly, by choosing the balancing impedance such that, $$Z_B = Z_0/M,$$

wherein $Z_0$ represents the load impedance or the characteristic impedance $Z_0$ (FIG. 1) of transmission bus 102 and $Z_B$ represents balancing impedance 304, a moderate attenuation factor will be provided between leads 302 and 312, a high attenuation factor will be provided between leads 310 and 312 and a low attenuation factor will be provided between leads 302 and 310.

Figure 4:
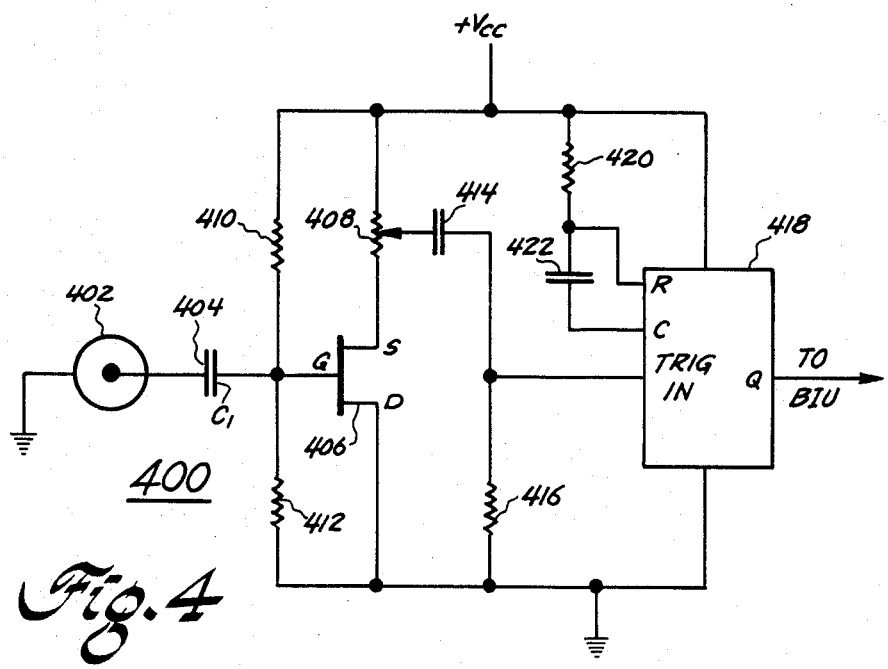
FIG. 4 is a schematic drawing of one embodiment of the voltage sensitive indicating unit of FIG. 2.

FIG. 4 shows a schematic diagram of a voltage sensitive indicating circuit 400 suitable for use in the invention. Voltage sensitive indicating unit 203 comprises two such circuits 400, one connected to transmission bus 102 to monitor $V_B$ and the other connected to directional coupler 205 to monitor coupler output voltage $V_c$.

Thus, in FIG. 4, a transistor amplifier circuit is shown coupled to the inner conductor of a coaxial cable 402, via a coupling capacitor 404, the outer conductor of cable 402 being connected to ground. Cable 402 represents line 204 (FIG. 2) for circuit 400 monitoring $V_B$ and line 206 (FIG. 2) for circuit 400 monitoring $V_c$. The transistor amplifier circuit comprises a transistor 406 having its source coupled to a supply voltage $V_{cc}$ via a variable pull up resistor 408. The gate of transistor 406 is coupled to the source voltage via resistor 410 and is further coupled to ground via resistor 412. Resistors 410 and 412 are provided to divide the source voltage therebetween and thereby properly bias the gate of transistor 406 to allow the transistor amplifier circuit to operate in its linear range for a known range of transmission voltages, to wit, $V_{min}$ and $V_{max}$ as discussed with reference to BIUs 106 of FIG. 1. Variable resistor 408 is coupled to ground via a coupling capacitor 414 and a resistor 416. The voltage across resistor 416 provides the output for the amplifier circuit.

The amplifier output is coupled to the input of a retriggerable monostable multivibrator circuit 418, the output of which provides the output of the voltage sensitive indicating circuit. A resistor 420 and a capacitor 422 are coupled intermediate monostable 418 and the supply voltage $V_{cc}$ for providing a time constant to the monostable as is known in the art.

By adjusting resistor 408, the gain of the transistor amplifier circuit can be controlled. Because monostable 418 is adapted to trigger at a predetermined magnitude of voltage, control over the amplifier gain, and hence control over the voltage input to monostable 418 provides control over the sensitivity of the voltage sensitive indicating circuit of FIG. 4. Thus, variable resistor 408 can be adjusted such that the circuit of FIG. 4 will respond to input voltage amplitudes greater than a predetermined threshold. Resistor 408 is, therefore, used to adjust the voltage sensitive circuit in each of the two circuits 400 in unit 203 to respectively respond to the first and second voltage thresholds, $V_{1t}$ and $V_{2t}$, as discussed above, in order to indicate the presence and direction of the received transmission.

Further, by proper choice of resistor 420 and capacitor 422, a time constant can be provided such that the output pulse width of monostable 418 is at least as long as the longest expected gap in a single transmission. Then, because the monostable is retriggerable, the monostable output will continue for the duration of the transmission by retriggering of monostable 418, without continuing for an excessive period after the transmission is terminated.

As an example, monostable 418 may comprise a retriggerable monostable as available from the Fairchild Company under the model number 96S02. Resistor 420 may comprise a 50 kilohm resistor and capacitor 422 may comprise a 320 picofarad capacitor giving a time constant of approximately 16 microseconds. Resistor 416 may comprise a 5 kilohm resistor and capacitor 414 may comprise a 200 picofarad capacitor. Variable resistor 408 may comprise a 1 kilohm resistor. Resistors 410 and 412 may comprise 390 kilohm and 100 kilohm resistor, respectively. Transistor 406 may comprise a field effect transistor model no. 2N5246 as available from the Texas Instruments Company. Hence, the transistor amplifier circuit will provide a gain adjustable between 0 and 4.5 for input voltages in the linear range. Coupling capacitor 404 may comprise a 0.001 microfarad capacitor. Supply voltage $V_{cc}$ may comprise a 5 volt supply.

As discussed above, voltage sensitive indicating unit 203 comprises two voltage sensitive circuits each as shown in FIG. 4, one coupled to directional coupler 205 and the other coupled to transmission bus 102. Hence, the output from unit 203 may comprise a two bit digital output wherein one bit indicates whether transmission bus 102 is busy and wherein the other bit indicates whether the transmission originated from the right or left end direction of DSCU 100. Further, it will be appreciated that in networks where it is only necessary to determine when a transmission originated from one end of transmission bus 102, unit 203 need only comprise one voltage sensitive circuit coupled to directional coupler 205 and adapted to indicate when a transmission originated from the desired direction.

In an alternate embodiment of the present invention, two direction sensitive coupling units may be implemented with each BIU in order to determine the direction from which a transmission originated. In the alternate embodiment, indicating unit 203 of each coupling unit comprises only one voltage sensitive circuit coupled to directional coupler 205 and is adapted to indicate when a transmission is received at coupler port 200, i.e., when $V_c$ exceeds $V_{1t}$. Then, a first one of the two coupling units is connected to transmission bus 102 to the right of the BIU $T_x/R_x$ port, as shown in FIG. 1. With the first unit so connected, coupler port 200 receives information signals originating from the right end of the transmission bus. A second of the two coupling units is connected to the transmission bus to the left of the $T_x/R_x$ port with coupler ports 200 and 201, and the attenuations f2 and f3 respectively associated therewith, reversed. The second unit so connected, receives on its port 200, information signals originating from the left end of the transmission bus. Thus, the first and second coupling units respectively provide indication for information signals originating from the right and left ends of the bus.

The attenuation factor $f_1$ along the transmission medium is, of course, not a necessary element of the operation of the invention. If a coupler device were available which provided a smaller or non-existent attenuation $f_1$, it would also be usable. The prime concern regarding the factor $f_1$, is that it is suitably accounted for in setting the threshold for $V_B$ which will indicate that information is on the medium.

Also, it will be appreciated by those skilled in the art that in networks where a digital indication is unnecessary, voltage sensitive unit 203 may be eliminated, as the ouput of coupler 205 itself indicates the source direction of received transmissions. Still other networks are envisioned where coupler 205 indicates source direction by amplification instead of attenuation and is used with or without unit 203.

Therefore, while only several presently envisioned embodiments of my novel direction sensitive coupling unit have been presented in detail herein, many modifications and variations will become apparent to those skilled in the art. It is my intent, therefore, to be limited only by the scope of the appended claims and not by the specific details presented herein.

What is claimed is:

1. A direction sensor for determining the direction from which information signals carried on a transmission medium of a communication system arrive at a node, said sensor adapted for coupling to said node and comprising:
   means for providing a first output signal when an information signal is received from a first direction along said medium;
   means for providing a second output signal when an information signal is received from a second direction along said medium;
   first indicating means having an input coupled to receive said first output signal and responsive thereto for providing a first digital data value indicating that said information signal has been received from said first direction; and
   second indicating means having an input coupled to said medium and responsive to said information signals for providing a second digital data value indicating the presence of said information signals on said medium such that the combination of said first and second digital values indicates the source direction of said information signal.

2. The sensor as recited in claim 1 wherein the voltage of said first signal is different from the voltage of said second signal.

3. The sensor as recited in claim 2 wherein said first and second signals comprise attenuated information signals and wherein the different voltages are obtained by attenuating information signals received from said first direction by a different degree than those received from said second direction.

4. The sensor as recited in claim 3 wherein said first and second output providing means comprises a hybrid transformer comprising:
   a first coil having M turns, a first lead for coupling to said medium and a second lead for coupling to ground; and
   a second coil having M+1 turns, third and fourth leads, and a tap, wherein M turns are provided between said tap and said third lead, said third lead being adapted for coupling to said medium, said fourth lead being coupled to said indicating means and said tap being adapted for coupling to ground via a balancing impedance $Z_B$, wherein the value of said impedance $Z_B$ is chosen such that:

$$Z_B = X_0/M$$

where $Z_0$ is equal to the characteristic impedance of said medium.

5. The sensor as recited in claim 1 wherein each said first and second indicating means comprises:
   means for variably amplifying the voltage received at the input of said indicating means; and
   retriggerable monostable multivibrator means coupled to said amplifying means for providing an output pulse of specified duration when the input voltage thereto exceeds a predetermined threshold, said amplifying means providing an output which exceeds said threshold for amplifier input voltages exceeding a predetermined value.

6. A direction sensor for determining whether an information signal carried on a transmission medium of a communication system arrives at a node from a first or a second source direction, said information signal having a magnitude not exceeding a maximum information signal value, said direction sensor adapted for coupling to said node, said direction sensor comprising:
   first means for attenuating information signals arriving from said first source direction by a first degree of attenuation;
   second means for attenuating information signals arriving from said second source direction by a second degree of attenuation;
   said second degree of attenuation selected to be greater than said first degree of attenuation;
   means for determining the source direction of the arriving information signal from the magnitude of the attenuated information signal; and
   said source direction determining means including first means for comparing the magnitude of the attenuated information signal to a first threshold reference value, said first threshold value selected to be greater than said maximum signal value attenuated by said second degree of attenuation;
   whereby said arriving information signal arrives from said first source direction when said first comparing means determines the magnitude of the attenuated information signal to be greater than said first threshold value.

7. The direction sensor of claim 6 wherein the magnitude of the information signal arriving at said node is not less than a minimum information signal value;

said source direction determining means further including second means for comparing the magnitude of the arriving information signal to a second threshold reference value, said second threshold value selected to be less than said minimum signal value;

whereby said arriving information signal arrives from said second source direction when said second comparing means determines the magnitude of the arriving information signal to be greater than said second threshold value and said first comparing means determines the magnitude of the attenuated information signal to be less than said first threshold value.

8. The direction sensor of claim 7 and further including indicating means for providing a first digital data value when said first comparing means determines the magnitude of the attenuated information signal is greater than said first threshold voltage;

said indicating means providing a second digital data value when said second comparing means determines the magnitude of the arriving information signal is greater than said second threshold value;

whereby said indicating means provides both said first and said second digital data values when said arriving information signal arrives from said first source direction, said indicating means providing only said second digital data value when said arriving information signal arrives from said second source direction.

9. A method for identifying the source direction of information signals arriving at a node along a communication medium, comprising the steps of:

generating a first signal in response to an information signal arriving at said node from a first direction along said medium;

generating a second signal in response to an information signal arriving at said node from a second direction along said medium;

responding to said first signal to provide a first digital data value indicating that an information signal has been received at said node from said first direction; and responding to said information signal to provide a second digital data value indicating the presence of an information signal on said medium such that the combination of said first and second digital data values indicates the source direction of said information signal.

* * * * *